(12) United States Patent
Kakiuchi

(10) Patent No.: US 7,166,932 B2
(45) Date of Patent: Jan. 23, 2007

(54) POWER CIRCUIT

(75) Inventor: Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 106 days.

(21) Appl. No.: 11/108,656

(22) Filed: Apr. 19, 2005

(65) Prior Publication Data

US 2005/0237043 A1    Oct. 27, 2005

(30) Foreign Application Priority Data

Apr. 21, 2004    (JP)    ............ P2004-125829

(51) Int. Cl.
*H02J 7/00*    (2006.01)
(52) U.S. Cl. .................. 307/66; 307/82
(58) Field of Classification Search .......... 307/64, 307/65, 66, 82
See application file for complete search history.

(56) References Cited

U.S. PATENT DOCUMENTS 5,049,805 A * 9/1991 Celenza et al. ............ 307/66
6,429,623 B2   8/2002 Hanada
6,790,175 B1   9/2004 Furusawa et al.

FOREIGN PATENT DOCUMENTS

JP    7-104015    4/1995
JP    2003-79069  3/2003

OTHER PUBLICATIONS

English language abstract of JP 7-104015, Apr. 1995.
English language abstract of JP 2003-79069, Mar. 2003.

* cited by examiner

*Primary Examiner*—Shawn Riley
(74) *Attorney, Agent, or Firm*—Greenblum & Bernstein, P.L.C.

(57) ABSTRACT

A power circuit for generating a standard voltage based on an input voltage, includes a step-down circuit, a step-up circuit, a voltage determiner, a voltage output unit, and a circuit actuator. The step-down circuit steps down the input voltage to the standard voltage, when the input voltage is larger than the standard voltage. The step-up circuit steps up the input voltage to the standard voltage, when the input voltage is smaller than the standard voltage. The voltage determiner determines whether the input voltage is larger than or smaller than the standard voltage. The voltage output unit receives the input voltage, and outputs the input voltage as a supply voltage when the voltage determiner determines that the input voltage is larger than the standard voltage, and outputs no voltage when the voltage determiner determines that the input voltage is smaller than the standard voltage. And the circuit actuator can detect the supply voltage, actuate the step-down circuit when the supply voltage is detected, and actuate the step-up circuit, when the supply voltage is not detected.

16 Claims, 3 Drawing Sheets

POWER CIRCUIT

BACKGROUND OF THE INVENTION

1. Field of the Invention

The present invention relates to voltage control in a power circuit, especially to voltage control in a power circuit for supplying electric power to an electronic machine by utilizing voltages from conventional power sources for generating low and high voltages.

2. Description of the Related Art

Some electronic machines can use a plurality of power sources. In such electric machines, it is necessary to change various voltages to a constant voltage, and to use the constant voltage. Therefore, in such electronic machines, step-down power circuits for stepping down the voltage from power sources, and step-up power circuits for stepping up the voltage from power sources, are used together.

A conventional power circuit that applies a constant voltage, generally includes both a step-up circuit for stepping up a voltage from a power source, being lower than an output voltage, and a step-down circuit for stepping down a voltage from another power source, being higher than an output voltage. In such power circuits, energy loss tends to be large mainly because of heat loss caused by a series regulators used for stepping down voltage in a step-down circuit.

On the other hand, when using only one of a step-up and step-down power circuit, some problems regarding power supply may occur. For example, in a case where only a step-down power circuit and a battery that generates an input voltage higher than an output voltage are used, when the input voltage becomes lower than the output voltage, as a result of the input voltage dropping due to long time usage of the battery, an electric machine having the step-down power circuit may stop suddenly. This is because the input voltage can not be recovered to an acceptable level, due to the absence of a step-up circuit.

SUMMARY OF THE INVENTION

Therefore, an object of the present invention is to provide a power circuit that can effectively apply a constant voltage by selectively operating a step-up circuit and a step down circuit according to the amount of the power source voltage.

A power circuit according to the present invention, is for generating a standard voltage based on an input voltage. The power circuit includes a step-down circuit, a step-up circuit, a voltage determiner, a voltage output unit, and a circuit actuator. The step-down circuit steps down the input voltage to the standard voltage, when the input voltage is larger than the standard voltage. The step-up circuit steps up the input voltage to the standard voltage, when the input voltage is smaller than the standard voltage. The voltage determiner determines whether the input voltage is larger than or smaller than the standard voltage. The voltage output unit receives the input voltage, and outputs the input voltage as a supply voltage when the voltage determiner determines that the input voltage is larger than the standard voltage, and outputs no voltage when the voltage determiner determines that the input voltage is smaller than the standard voltage. The circuit actuator can detect the supply voltage, and actuates the step-down circuit when the supply voltage is detected, and that actuates the step-up circuit, when the supply voltage is not detected.

The circuit actuator may comprise a first voltage applier that applies no voltage to the step-up circuit when the voltage determiner determines the input voltage is larger than the standard voltage, and that applies the input voltage to the step-up circuit when the voltage determiner determines that the input voltage is smaller than the standard voltage. The first voltage applier may comprise an N-channel FET.

The power circuit can further comprise a voltage controller that applies no voltage to the first voltage applier when the supply voltage is provided to the voltage controller, and applies voltage to the first voltage applier when the supply voltage is not provided to the voltage controller, so that the voltage controller controls the voltage applied to the step-up circuit by the first voltage applier. The voltage controller may comprise first and second transistors connected to each other.

The power circuit can further comprise a switch for starting the power circuit, and the standard voltage can be applied to the first transistor when the switch is turned on.

A constant voltage can always be applied to the second transistor by an external power source, while the power circuit is working. And the voltage controller can apply a constant voltage to the first voltage applier when the input voltage is not applied to the voltage controller.

The circuit actuator can further comprise a second voltage applier that applies no voltage to the step-up circuit when the supply voltage is applied to the second voltage applier, and that applies the standard voltage to the step-up circuit when the supply voltage is not applied to the second voltage applier. The second voltage applier can further comprise a third transistor connected between the voltage output unit and the step-up circuit.

The power circuit can further comprise a switch connected to the third transistor and the step-up circuit for starting the power circuit. And the standard voltage can be applied to the third transistor and the step-up circuit when the switch is turned on. The third transistor may be connected to a ground.

The power circuit can further comprise a third voltage applier that applies the supply voltage to the step-down circuit when the supply voltage is applied to the third voltage applier, and that applies no voltage to the step-down circuit when the supply voltage is not applied to the third voltage applier.

The third voltage applier can comprise fourth and fifth transistors connected to each other.

The power circuit can further comprise a switch for starting the power circuit, and the standard voltage is applied to the fourth transistor when the switch is turned on.

The fifth transistor may apply the supply voltage to the step-down circuit when the supply voltage is applied to the fifth transistor, and apply no voltage to the step-down circuit when the supply voltage is not applied to the fifth transistor.

The circuit actuator can comprise a first voltage applier, a voltage controller, a second voltage applier and a third voltage applier, and a switch for applying the standard voltage to the circuit actuator.

The first voltage applier applies no voltage to the step-up circuit when the voltage determiner determines the input voltage is larger than the standard voltage, and applies the input voltage to the step-up circuit when the voltage determiner determines the input voltage is smaller than the standard voltage.

The voltage controller applies no voltage to the first voltage applier when the supply voltage is provided to the voltage controller, and applies voltage to the first voltage applier when the supply voltage is not provided to the voltage controller, so that the voltage controller controls the voltage applied to the step-up circuit by the first voltage applier.

The second voltage applier applies no voltage to the step-up circuit when the supply voltage is applied to the second voltage applier, and applies the standard voltage to the step-up circuit when the supply voltage is not applied to the second voltage applier.

The third voltage applier applies the supply voltage to the step-down circuit when the supply voltage is applied to the third voltage applier, and applies no voltage to the step-down circuit when the supply voltage is not applied to the third voltage applier.

And the voltage controller, the second voltage applier, and the third voltage applier are respectively connected to the voltage output unit and connected to an output terminal of the step-down circuit and an output terminal of the step-up circuit. When the switch is on, the standard voltage is applied to the circuit actuator so that the voltage controller, the second voltage applier, and the third voltage applier work in accordance with the supply voltage output by the voltage output unit, and when the switch is off, the standard voltage is not applied to the circuit actuator so that the voltage controller, the second voltage applier, and the third voltage applier do not work regardless of the supply voltage output by the voltage output unit.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with reference to the attached drawing.

Figure 1:
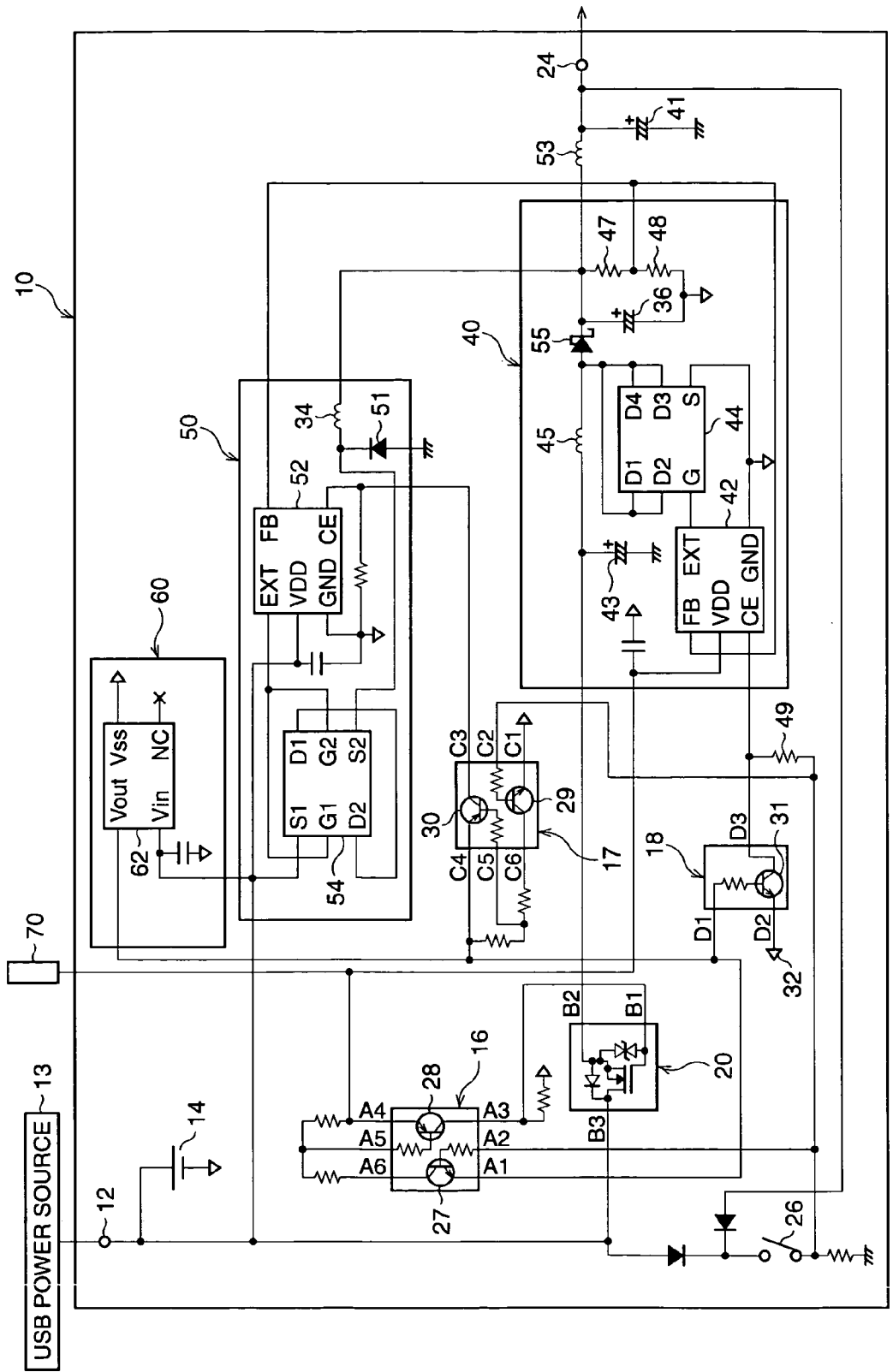
FIG. 1 is a block diagram of the power circuit of the embodiment of the present invention.
Figure 2:
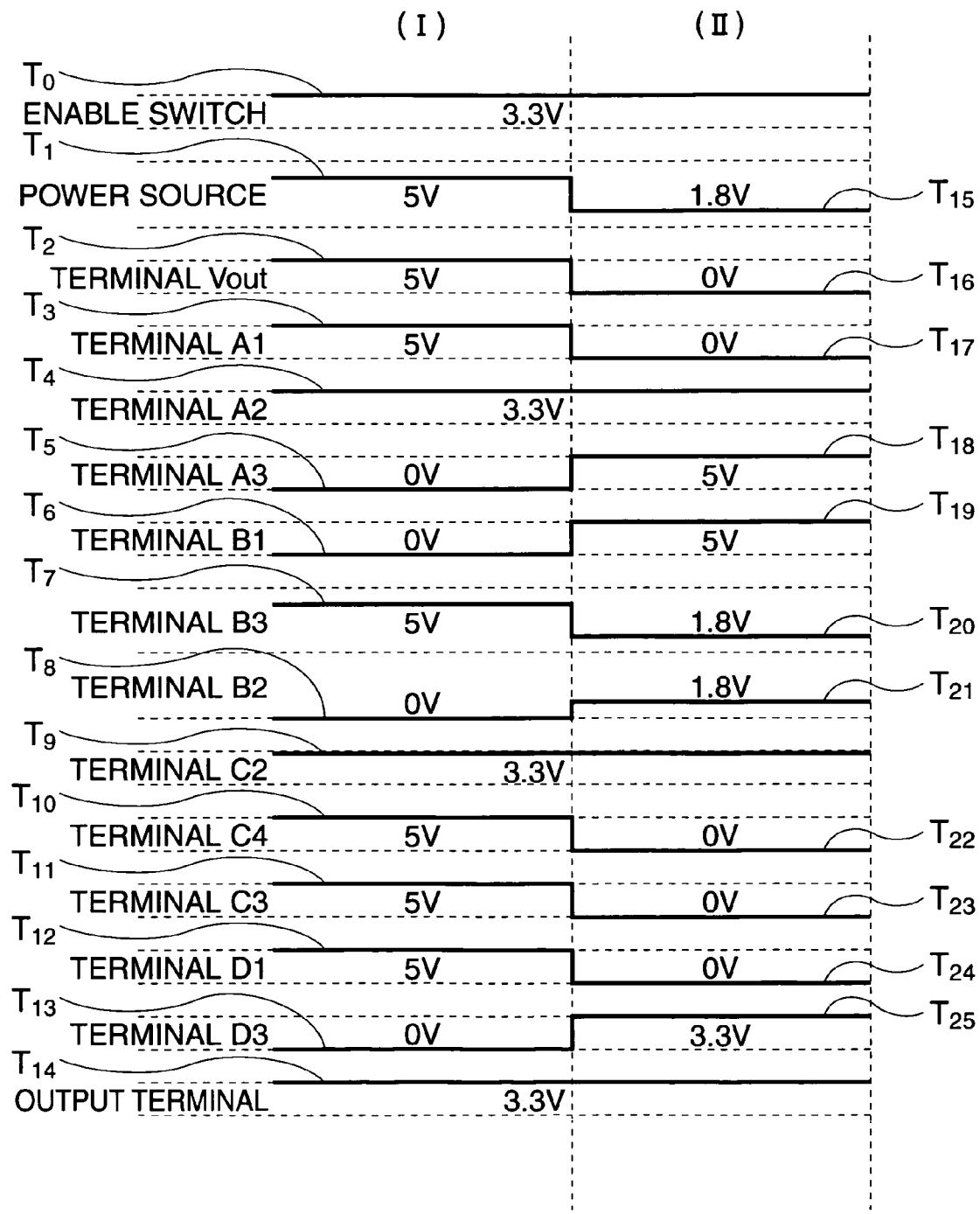
FIG. 2 is a timing chart representing change of voltages at each terminal when an enable switch in the power circuit is in the on state.
Figure 3:
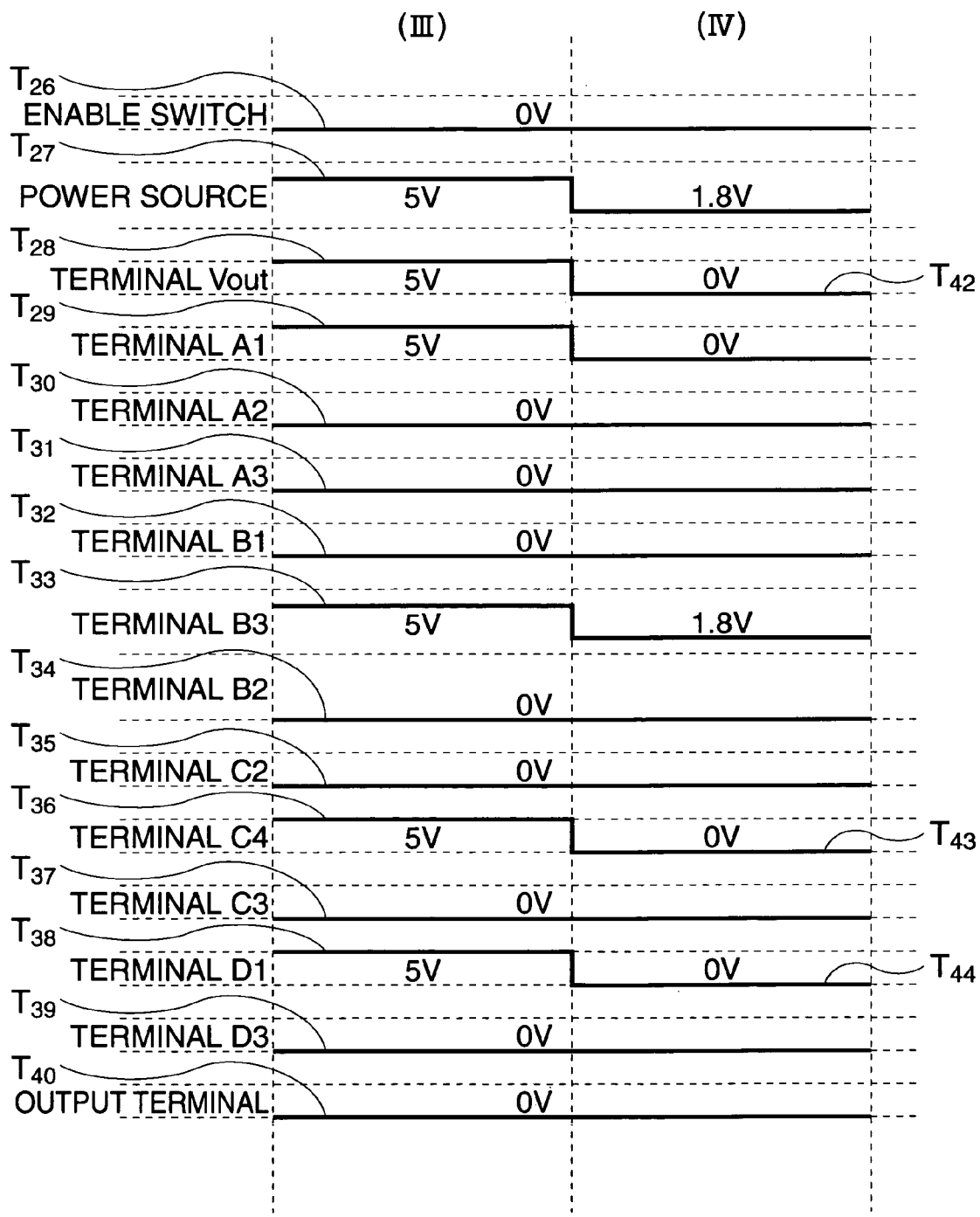
FIG. 3 is a timing chart representing change of voltages at each terminal when the enable switch is in the off state.

FIG. 1 is a block diagram of the power circuit of the embodiment of the present invention. FIG. 2 and FIG. 3 are timing charts representing change of voltages at each terminal when an enable switch in the power circuit is in the on state and off state, respectively.

A power circuit 10 is provided in a digital camera (not shown), and has a battery 14, first to third digital transistors 16 to 18, an N-channel MOSFET 20, a step-up circuit 40, a step-down circuit 50, and a voltage detecting device 60 (see FIG. 1). Although the battery 14 usually inputs a voltage, when a USB power source 13 is connected to the power circuit 10 via the USB terminal 12, the USB power source 13 inputs a voltage to the power circuit 10 instead of the battery 14. The input voltages of the battery 14 and the USB power source 13 are 1.8(V) and 5(V) respectively.

The input voltage from the USB power source 13 and the battery 14 is applied to the step-up circuit 40 or the step-down circuit 50, via the first to third digital transistors 16 to 18, the N-channel MOSFET 20, and the voltage detecting device 60, or it is applied directly. The power circuit 10 controls the voltages in both cases, that is in the case where the USB power source 13 inputs voltage and in the other case where the battery 14 does, so that a constant voltage (a standard voltage) of 3.3(V) is output from an output terminal 24, regardless of the input voltages. Note that a motor driving power circuit 70 provided in the digital camera as well as the power circuit 10, inputs a constant voltage of 5(V) to the power circuit 10.

In the power circuit 10, an enable switch 26 is provided. When the enable switch 26 is turned on by a user, a pull-up voltage of the standard voltage output from the output terminal 24, is applied to the first to third digital transistors 16 to 18 (see $T_0$ in FIG. 2). However, when no voltage is output from the output terminal 24, another pull-up voltage from the USB power source 13 or the battery 14, is applied to the first to third digital transistors 16 to 18.

When the enable switch 26 is on, the USB power source 13 is connected to the power circuit 10 and a voltage of 5(V) being larger than the standard voltage is provided to the power circuit 10, so that the power circuit 10 is in the "high-voltage controlling state (I)" (see FIG. 2). In the "high-voltage controlling state (I)", only the step-down circuit 50 functions. On the other hand, when the enable switch 26 is on and a voltage of 1.8(V) being smaller than the standard voltage is provided to the power circuit 10 by the battery 14, the power circuit 10 changes to the "low-voltage controlling state (II)" (see FIG. 2). And then, in this case, only the step-up circuit 40 works.

When the enable switch 26 is off, the output voltage from the output terminal 24 is 0(V), in both a "high-voltage state (III)" where a 5(V) voltage is applied to the power circuit 10 by the USB power source 13, and a "low-voltage state (IV)" where a 1.8(V) voltage is applied by the battery 14 (see FIG. 3). Operations of the power circuit 10 in each of these states, are explained below.

In the "high-voltage controlling state (I)", the enable switch 26 is on, and the USB power circuit 13 applies a 5(V) voltage to the voltage detecting device 60, the step-down circuit 50, and the N-channel MOSFET 20 ($T_1$). In the voltage detecting device 60, a voltage detecting unit 62 is provided. When the input voltage applied to an input terminal $V_{in}$ of the voltage detecting unit 62 is determined as being larger than the standard voltage of 3.3(V), the voltage detecting unit 62 outputs the input voltage as a supply voltage from an output terminal $V_{out}$. And when the input voltage applied to the input terminal $V_{in}$ is determined as being smaller than the standard voltage of 3.3(V), the voltage detecting unit 62 outputs no voltage from the output terminal $V_{out}$. Therefore, when a 5(V) voltage is applied to the voltage detecting device 60, the supply voltage of 5(V) is output from the output terminal $V_{out}$ ($T_2$).

The supply voltage of 5(V) output from the output terminal $V_{out}$, is applied to a terminal A1 of the first digital transistor 16 ($T_3$). Here, a voltage of 3.3(V) is applied to a terminal A2 of the first digital transistor 16 ($T_4$), because the enable switch 26 is on, as mentioned above. As a result of this, a collector current does not flow in a first transistor 27 included in the first digital transistor 16, because a voltage in the reverse direction is applied between a base and an emitter of the first transistor 27. Therefore, the second transistor 28 changes to the off state and no voltage is output from a terminal A3, because a base current does not flow to a second transistor 28 included in the first digital transistor 16 ($T_5$).

The N-channel MOSFET 20 has a terminal B1 as a gate, a terminal B2 as a source, and a terminal B3 as a drain. The gate terminal B1 is connected to the terminal A3 of the first digital transistor 16, in this case, no voltage is applied to the terminal B1 ($T_6$). Therefore, the N-channel MOSFET 20 is in the off state, and no voltage is output from the terminal B2 of a source ($T_8$), although the 5(V) voltage from the USB power source 13 is applied to the terminal B3 of a drain ($T_7$).

On the other hand, 3.3(V) is applied to a terminal C2 of the second digital transistor 17, because the enable switch 26 is on ($T_9$). In addition to this, a voltage of 5(V) is applied to a terminal C4 of the second digital transistor 17 from the output terminal $V_{out}$ of the voltage detecting unit 62 ($T_{10}$). As a result, collector current flows to a third transistor 29 of the second digital transistor 17 via a terminal C6, and base current flows to a fourth transistor 30 of the second digital transistor 17 via a terminal C5. And then, since voltage is applied between the base and the emitter of the fourth transistor 30 in a forward direction, the fourth transistor 30 becomes on and 5(V) is applied to the step down circuit 50 via a terminal C3 ($T_{11}$).

The step step-down circuit 50 has a step-down DC converter 52 and a dual MOSFET 54 including two P-channel MOSFETs. A first P-channel MOSFET included in the dual MOSFET 54, has a first gate terminal G1, a first source terminal S1, and a first drain terminal D1, and a second P-channel MOSFET has a second gate terminal G2, a second source terminal S2, and a second drain terminal D2. When 5(V) from the terminal C3 of the second digital transistor 17 is applied to a terminal CE of the step-down DC converter 52, and a voltage from the USB power source 13 is applied to a terminal VDD, a control pulse having an amplitude of 5(V) is provided to the first and second gate terminals G1 and G2 from a terminal EXT.

In the dual MOSFET 54, 5(V) is applied to the first source terminal S1 from the USB power source 13, and then, drain current flows in the first P-channel MOSFET. Current flows to a first capacitor 36 in the step-up circuit 40 from the second source terminal S2, and the first capacitor 36 is charged, because the drain current flows to the second drain terminal D2 of the second P-channel MOSFET. Note that current flowing to the first capacitor 36 from the second source terminal S2, is smoothed by a first schottky diode 51 and a first coil 34.

Voltage generated by an electric charge at the first capacitor 36, is output from the output terminal 24 after being smoothed by a second coil 53 and a second capacitor 41. A feedback terminal FB of the step-down converter 52 detects a divided voltage of the first capacitor 36 divided by a first and second resistors 47 and 48. A duty ratio of the voltage applied to the first and second gate terminals G1 and G2 of the dual MOSFET 54 from the terminal EXT of the step-down DC converter 52 is modulated, so that the output voltage (standard voltage) output by the output terminal 24 becomes a constant voltage of 3.3(V). Note that the reason the dual MOSFET 54 has the first and second P-channel MOSFETs, is to prevent the reverse flow of current from the step-up circuit 40.

A voltage of 5(V) is applied to a terminal D1 of the third digital transistor 18 from the output terminal $V_{out}$ of the voltage detecting unit 62, as well as the terminal C4 of the second digital transistor 17 ($T_{12}$). Therefore, base current flows to a fifth transistor 31 of the third digital transistor 18, collector current also flows because the emitter is connected to the ground 32, and a terminal D3 of the third digital transistor 18 is shorted to the ground 32 ($T_{13}$). That is, no voltage is applied to the step-up circuit 40 because the third digital transistor 18 is in the on state, so that the step-up circuit 40 does not work in the "high-voltage controlling state (I)".

Summarizing the above description, in the "high-voltage controlling state (I)", a step-up DC converter 42 and a MOSFET 44 in the step-up circuit 40 do not work, and the voltage of 5(V) input to the power circuit 10 is stepped down by the step-down circuit 50, so that the constant voltage of 3.3(V) is output by the output terminal 24 ($T_{14}$).

When the power source is switched from the USB power source 13 to the battery 14, the state is changed from the "high-voltage controlling state (I)" to the "low-voltage controlling state (II)". In the "low-voltage controlling state (II)", a voltage of 1.8 (V) ($T_{15}$) is applied to the voltage detecting device 60, the step-down circuit 50, and the N-channel MOSFET 20. When 1.8 (V) (being smaller than 3.3 (V)) is applied to the input terminal $V_{in}$ of the voltage detecting unit 62, no voltage is output from the output terminal $V_{out}$ ($T_{16}$) as mentioned above, and no voltage is applied to the terminal A1 of the first digital transistor 16 ($T_{17}$).

The enable switch 26 is on at this time, and then 3.3 (V) is applied to the terminal A2 of the first digital transistor 16 ($T_4$). As a result of this, in the first transistor 27, a voltage is applied between the base and the emitter in the reverse direction, and the collector current flows. Base current flows at the second transistor 28 because of the collector current at the first transistor 27, and 5(V) is applied to a terminal A4 of the first transistor 16 from the motor driving power circuit 70, so that a voltage of 5(V) is output from the terminal A3 of the third transistor 28 ($T_{18}$).

Therefore, 5(V) is applied to the gate terminal B1 of the N-channel MOSFET 20 ($T_{19}$), and 1.8(V) from the battery 14 is also applied to the drain terminal B3 ($T_{20}$), so that 1.8 (V) is applied to a third capacitor 43 of the step-up circuit 40 ($T_{21}$) from the source terminal B2. That is, the N-channel MOSFET 20 turns on. The N-channel MOSFET 20 can efficiently apply the power source voltage from the battery 14 of the primary power source, to the step-up circuit 40, because the resistance of the N-channel MOSFET 20 is quite low, and the gate voltage is also low, 1.8 (V).

On the other hand, although 3.3 (V) is applied to the terminal C2 of the second digital transistor 17 ($T_9$), no voltage is applied to the terminal C4 from the output terminal $V_{out}$ of the voltage detecting unit 62 ($T_{22}$). As a result of this, collector current does not flow to the fourth transistor 30, and no voltage is applied to the step-down circuit 50 from the terminal C3 ($T_{23}$). That is, the second digital transistor 17 turns off, and the step-down circuit 50 does not work in the "low-voltage controlling state (II)".

Voltage at the terminal D1 of the third digital transistor 18 is 0 (V) at this time ($T_{24}$), because no voltage is applied from the output terminal $V_{out}$ of the voltage detecting unit 62 ($T_{16}$). As a result of this, the third digital transistor 18 turns off, and voltage at the terminal D3 becomes 3.3 (V), because of the on state of the enable switch 26 and a pull-up by a third resistor 49 ($T_{25}$). And then, 3.3 (V) is applied to the step-up DC converter 42 of the step-up circuit 40.

When the 3.3 (V) is applied to a terminal CE of the step-up DC converter 42, and voltage from the motor driving power circuit 70 is applied to a terminal VDD, the step-up DC converter 42 outputs a control pulse having an amplitude of 5(V) to a gate terminal G of the MOSFET 44 from the terminal EXT. The MOSFET 44 is an N-channel MOSFET having four drain terminals, these are a first to a fourth terminals D1 to D4, for efficiently releasing heat, and when voltage is applied to the gate terminal G, current flows from the first to the fourth terminals D1 to D4. When voltage is applied to the gate terminal G of the MOSFET 44 from the terminal EXT of the step-down DC converter 52, current flows to a ground GND from a second coil 45, via the drain and the source. On the other hand when voltage is not applied to the MOSFET 44 from the terminal EXT of the step-down DC converter 52, electric power stored in the second coil 45 is provided to the first capacitor 36, via a second schottky diode 55. As a result of this, the first capacitor 36 is charged.

Note that a feedback terminal FB of the step-up converter 42 detects a divided voltage of the voltage at the first capacitor 36 divided by a first and second resistor 47 and 48, and modulates a duty ratio of the voltage applied to the gate terminal G of the MOSFET 44 from the terminal EXT of the step-up DC converter 42, so that the voltage smoothed by the second coil 53 and the second capacitor 41, becomes a constant 3.3 (V).

Summarizing the above description, when a voltage of 1.8(V) is input to the power circuit 10, the step-down circuit 50 does not work, and the voltage of 1.8(V) input to the power circuit 10 is stepped up by the step-up circuit 40 in the "low-voltage controlling state (II)", so that the voltage of 3.3 (V) is output from the output terminal 24 ($T_{14}$).

In the "high-voltage state (III)" where a voltage is applied to the power circuit 10 by the USB power source 13, and the enable switch 26 is off (see FIG. 3), no voltage is applied to the first and second digital transistors 16 and 17 ($T_{26}$) because there is no pull-up. A voltage of 5 (V) from the USB power source 13 ($T_{27}$) is applied to the voltage detecting device 60, the step-down circuit 50, and the N-channel MOSFET 20. And then, as the voltage applied to the input terminal $V_{in}$ of the voltage detecting unit 62 is 5 (V), being larger than the standard voltage of 3.3 (V), a voltage of 5 (V) is output from the output terminal $V_{out}$ ($T_{28}$).

Although the voltage of 5 (V) output from the voltage detecting device 60 is applied to the terminal A1 of the first digital transistor 16 ($T_{29}$), no voltage is applied to the terminal A2 of the first digital transistor 16 ($T_{30}$), because the enable switch 26 is off. As a result, in the first transistor 27 included in the first digital transistor 16, a voltage is applied between the base and the emitter in the reverse direction, and the collector current does not flow. Therefore, in the second transistor 28 of the first digital transistor 16, base current does not flow, the first digital transistor 16 turns off, and no voltage is output from the terminal A3 ($T_{31}$).

Accordingly, in the N-channel MOSFET 20, no voltage is applied to the gate terminal B1 ($T_{32}$), and 5(V) is applied to the drain terminal B3 ($T_{33}$), so that no voltage is output from the source terminal B2 ($T_{34}$).

On the other hand, no voltage is applied to the terminal C2 of the second digital transistor 17 because the enable switch 26 is off ($T_{35}$), and collector current does not flow to the third transistor 29. Although 5 (V) is applied to the terminal C4 from the output terminal $V_{out}$ ($T_{36}$), collector current does not flow to the third transistor 29, so that base current does not flow to the fourth transistor 30, and then the fourth transistor 30 turns off. As a result of this, no voltage is applied to the step-down circuit 50 from the terminal C3 ($T_{37}$). Therefore, the step-down circuit 50 does not function in the "high-voltage state (III)".

A voltage of 5 (V) is applied to the terminal D1 of the third digital transistor 18 from the output terminal $V_{out}$ ($T_{38}$). And then, because the emitter of the third digital transistor 18 is connected to the ground 32, the terminal D3 is shorted to the GND, the same as in the "high-voltage controlling state (I)". Further, because the enable switch 26 is off, pull up does not occur and voltage at the terminal D3 becomes GND level ($T_{39}$), so that the step-up circuit 40 does not work.

As mentioned above, although the voltage of 5 (V) is applied to the power circuit 10, no voltage is output from the output terminal 24 ($T_{40}$) in the "high-voltage state (III)". This is because voltage is not applied to the step-up circuit 40 and to the step-down circuit 50.

On the other hand, when the state has changed to the "low-voltage state (IV)" where the battery 14 applies voltage to the power circuit 10 and the enable switch 26 is off, no voltage is applied to the first and second digital transistors 16 and 17 ($T_{26}$) because the enable switch 26 is off. At this time, because the voltage from the battery 14 is 1.8 (V) ($T_{41}$), being smaller than the standard voltage of 3.3 (V), no voltage is applied by the voltage detecting device 60 ($T_{42}$). Therefore, no voltage is applied to the terminal B1 of the N-channel MOSFET 20 from the terminal A3 ($T_{32}$), and no voltage is output from the terminal B2 of the N-channel MOSFET 20 ($T_{34}$).

No voltage is applied to the terminal C2 because the enable switch 26 is off ($T_{35}$), and voltage is not applied to the terminal C4 by the output terminal $V_{out}$ ($T_{43}$). Therefore, no voltage is applied to the step-down circuit 50 from the terminal C3 of the second digital transistor 17 ($T_{37}$), so that the step-down circuit 50 does not work in the "low-voltage state (IV)".

And then, because no voltage is applied to the terminal D1 of the third digital transistor 18 from the output terminal $V_{out}$ ($T_{44}$) and the enable switch is off, the third digital transistor 18 is off. Further, because the enable switch 26 is off, pull up does not occur and voltage at the terminal D3 becomes GND level ($T_{39}$), so that the step-up circuit 40 does not work.

As mentioned above, although the voltage of 1.8 (V) is applied to the power circuit 10, no voltage is output from the output terminal 24 ($T_{40}$) in the "low-voltage state (IV)". This is because voltage is not applied to the step-up circuit 40, nor to the step-down circuit 50.

Note that the power circuit 10 can be configured by conventional elements. For example, the first and second digital transistors 16 and 17 can be "EMD6" produced by ROHM CO., LTD., the third digital transistor 18 can be "DTG124EM" produced by ROHM CO., LTD., and the N-channel MOSFET 20 can be "Si2312DS" produced by VISHAY SILICONIX, and so on. Further, the voltage detecting unit 62 can be "XC61CC3302" produced by TOREX SEMICONDUCTOR LTD., the step-down DC converter 52 can be "XC6366D105MR" produced by TOREX SEMICONDUCTOR LTD., the dual MOSFET 54 can be "Si1903DL" produced by VISHAY SILICONIX, the step-up DC converter 42 can be "XC6368D105MR" produced by TOREX SEMICONDUCTOR LTD., and the MOSFET 44 can be "Si1406DH" produced by VISHAY SILICONIX.

As mentioned above, in this embodiment, the power circuit 10 that can effectively provide a constant voltage, is provided by making one of the step-up circuit 40 and the step-down circuit 50 selectively operate and making the other not operate according to the input voltage from the power sources, and by using the first to third digital transistor 16s to 18, the N-channel MOSFET 20, and the voltage detecting device 60. And the power circuit 10 does not output voltage regardless of the input voltage from the power sources, when the enable switch 26 is off, because the first and second digital transistors 16 and 17 are off, and both the step-up circuit 40 and step-down circuit 50 are non-operational.

The amount of voltage applied to the power circuit 10 from the power sources such as the USB power source 13 and the battery 14, are not limited to those of this embodiment, as long as one is larger than the output voltage from the power circuit 10, and the other is smaller than that. That is, as long as the USB power source 13 inputs voltage larger than 3.3 (V), and the battery 14 outputs voltage smaller than 3.3 (V), any voltage amount can be input. Further, by changing the design of the step-up circuit 40 and the step-down circuit 50, the amount of the output voltage from the output terminal $V_{out}$ can be adjusted.

The power sources are not limited to the USB power source 13 and the battery 14. For example, another battery that can apply voltage larger than the standard voltage, can be used instead of the USB power source 13. In this case, when the voltage input by the battery becomes lower than the output voltage, as a result of a gradual drop of the input voltage caused by long time usage of the battery, outputting the constant voltage is still possible. This is because the step-up circuit 40 automatically operates instead of the step-down circuit 50.

Both of the USB power source 13 and the battery 14 can be jointly used. In this case, the amount of the input voltage becomes that between both power sources, and one of the step-up circuit 40 and the step-down circuit 50 is automatically selected to change the input voltage, so that a constant voltage can be output.

Finally, it will be understood by those skilled in the art that the foregoing description is of a preferred embodiment of the apparatus, and that various changes and modifications may be made to the present invention without departing from the scope thereof.

The present disclosure relates to subject matter contained in Japanese Patent Application No. 2004-125829 (filed on Apr. 21, 2004) which is expressly incorporated herein, by reference, in its entirety.

The invention claimed is:

1. A power circuit for generating a standard voltage based on an input voltage, said power circuit comprising:
   a step-down circuit that steps down said input voltage to said standard voltage, when said input voltage is larger than said standard voltage;
   a step-up circuit that steps up said input voltage to said standard voltage, when said input voltage is smaller than said standard voltage;
   a voltage determiner that determines whether said input voltage is larger than or smaller than said standard voltage;
   a voltage output unit that receives said input voltage, and outputs said input voltage as a supply voltage when said voltage determiner determines that said input voltage is larger than said standard voltage, and outputs no voltage when said voltage determiner determines that said input voltage is smaller than said standard voltage; and
   a circuit actuator that can detect said supply voltage, and that actuates said step-down circuit when said supply voltage is detected, and that actuates said step-up circuit when said supply voltage is not detected.

2. The power circuit according to claim 1, wherein said circuit actuator comprises:
   a first voltage applier that applies no voltage to said step-up circuit when said voltage determiner determines said input voltage is larger than said standard voltage, and that applies said input voltage to said step-up circuit when said voltage determiner determines said input voltage is smaller than said standard voltage.

3. The power circuit according to claim 2, wherein said first voltage applier comprises an N-channel FET.

4. The power circuit according to claim 2, further comprising:
   a voltage controller that applies no voltage to said first voltage applier when said supply voltage is provided to said voltage controller, and applies voltage to said first voltage applier when said supply voltage is not provided to said voltage controller, so that said voltage controller controls the voltage applied to said step-up circuit by said first voltage applier.

5. The power circuit according to claim 4, wherein said voltage controller comprises:
   a first transistor; and
   a second transistor connected to said first transistor.

6. The power circuit according to claim 5, further comprising a switch for starting said power circuit;
   wherein said standard voltage is applied to said first transistor when said switch is turned on.

7. The power circuit according to claim 5, wherein an external power source always applies a constant voltage to said second transistor while said power circuit is working, and said voltage controller applies said constant voltage to said first voltage applier when said input voltage is not applied to said voltage controller.

8. The power circuit according to claim 1, wherein said circuit actuator further comprises:
   a second voltage applier that applies no voltage to said step-up circuit when said supply voltage is applied to said second voltage applier, and applies said standard voltage to said step-up circuit when said supply voltage is not applied to said second voltage applier.

9. The power circuit according to claim 8, wherein said second voltage applier further comprises:
   a third transistor connected between said voltage output unit and said step-up circuit.

10. The power circuit according to claim 9, further comprising:
    a switch connected to said third transistor and said step-up circuit for starting said power circuit;
    wherein said standard voltage is applied to said third transistor and said step-up circuit when said switch is turned on.

11. The power circuit according to claim 9, wherein said third transistor is connected to a ground.

12. The power circuit according to claim 1, further comprising:
    a third voltage applier that applies said supply voltage to said step-down circuit when said supply voltage is applied to said third voltage applier, and applies no voltage to said step-down circuit when said supply voltage is not applied to said third voltage applier.

13. The power circuit according to claim 12, wherein said third voltage applier comprises:
    a fourth transistor; and
    a fifth transistor connected to said fourth transistor.

14. The power circuit according to claim 13, further comprising a switch for starting said power circuit;
    wherein said standard voltage is applied to said fourth transistor when said switch is turned on.

15. The power circuit according to claim 13, wherein said fifth transistor applies said supply voltage to said step-down circuit when said supply voltage is applied to said fifth transistor, and applies no voltage to said step-down circuit when said supply voltage is not applied to said fifth transistor.

16. The power circuit according to claim 1, wherein said circuit actuator comprises:

a first voltage applier that applies no voltage to said step-up circuit when said voltage determiner determines said input voltage is larger than said standard voltage, and that applies said input voltage to said step-up circuit when said voltage determiner determines said input voltage is smaller than said standard voltage;

a voltage controller that applies no voltage to said first voltage applier when said supply voltage is provided to said voltage controller, and applies voltage to said first voltage applier when said supply voltage is not provided to said voltage controller, so that said voltage controller controls the voltage applied to said step-up circuit by said first voltage applier;

a second voltage applier that applies no voltage to said step-up circuit when said supply voltage is applied to said second voltage applier, and applies said standard voltage to said step-up circuit when said supply voltage is not applied to said second voltage applier;

a third voltage applier that applies said supply voltage to said step-down circuit when said supply voltage is applied to said third voltage applier, and applies no voltage to said step-down circuit when said supply voltage is not applied to said third voltage applier; and a switch for applying said standard voltage to said circuit actuator;

wherein said voltage controller, said second voltage applier, and said third voltage applier are respectively connected to said voltage output unit and connected to an output terminal of said step-down circuit and an output terminal of said step-up circuit, said standard voltage is applied to said circuit actuator so that said voltage controller, said second voltage applier, and said third voltage applier work in accordance with said supply voltage output by said voltage output unit, when said switch is on, and said standard voltage is not applied to said circuit actuator so that said voltage controller, said second voltage applier, and said third voltage applier do not work regardless of said supply voltage output by said voltage output unit, when said switch is off.

* * * * *